June 3, 1969 P. H. JACOBS 3,448,342

SELF-RESETTING SEMICONDUCTOR DEVICE PROTECTION CIRCUIT

Filed Feb. 6, 1967 Sheet 1 of 2

Inventor
PAUL H. JACOBS
BY
[signature]
ATTYS.

Inventor
PAUL H. JACOBS
BY Mueller, Aichele & Rauner
ATTYS.

United States Patent Office 3,448,342

Patented June 3, 1969

3,448,342

SELF-RESETTING SEMICONDUCTOR DEVICE PROTECTION CIRCUIT

Paul H. Jacobs, Melrose Park, Ill., assignor to Motorola, Inc., Franklin Park, Ill., a corporation of Illinois Filed Feb. 6, 1967, Ser. No. 614,109
Int. Cl. H02h 7/00, 3/28
U.S. Cl. 317—33 10 Claims

ABSTRACT OF THE DISCLOSURE

A protection circuit coupling a power supply to the semiconductor device to be protected. The protection circuit operates to reduce the power supplied to the semiconductor device to prevent excessive current flow therethrough. After a predetermined time period the circuit automatically applies full power to the semiconductor device for normal operation.

*Cross reference*

This application is related to application Ser. No. 614,-111 of Ross E. Ruthenberg and Lucien C. Winham filed Feb. 6, 1967.

*Background*

Semiconductor devices, such as power transistors used in electronic devices, are often operated as close to their maximum ratings as possible in order to obtain the maximum possible power output from the transistors. In order to prevent the damage to the transistors caused by destructive current flow therethrough, protection circuits are used to couple the power supply to the transistors being protected. This is of particular importance in mobile equipment where the equipment is subjected to many transients which can cause damage to the power output transistors if no protection is provided. The antenna circuit of mobile equipment is particularly susceptible to transients which may be caused by the antenna striking a tree or brush in field operation, or by the presence of nearby transmitters, the radiations of which are picked up by the antenna and coupled to the power output transistors of the mobile equipment.

Protection circuits used with mobile equipment act to reduce or cut off the power supply to the power output transistors when destructive currents begin to flow therethrough in order to prevent damage to the transistors. In many applications it is desirable that full power be automatically applied to the power output transistors upon the removal of the cause of their malfunction so that the operator need not concern himself with the operation of the protection circuit. This is particularly important in mobile equipment used in the field where the cause of the malfunction is usually of a temporary nature.

*Summary*

It is, therefore, an object of this invention to provide an improved self-resetting transistor protection circuit.

Another object of this invention is to provide a self-resetting transistor protection circuit wherein the protection circuit automatically restores full power to the transistors being protected after a sufficient time has passed to permit the transistors to return to a safe operating temperature.

In practicing this invention a self-resetting transistor protection circuit is provided coupling the power supply to the transistors to be protected. The protection circuit operates to provide supply currents in a normal operating range to the transistor to be protected and further operates to reduce or cut off the current supplied to the transistor in the event malfunction occurs and the supply current reaches a destructive range of currents. A first SCR is provided which is normally biased to non-conduction. The protection circuit acts to bias the first SCR to conduction when the current supplied to the power transistors reaches the destructive range. The conduction of the first SCR acts to cut off or reduce the current applied to the transistor to be protected.

A normally conductive second SCR is coupled in the circuit together with a capacitor and a resistor. The action of the protection circuit in causing conduction of the first SCR acts to switch the capacitor across the second SCR to cause the second SCR to become non-conductive. With the second SCR non-conductive the capacitor charges through the resistor to a predetermined voltage level. The predetermined voltage level acts to cause conduction of the second SCR switching the capacitor across the first SCR to cause it to become non-conductive. With the second SCR non-conductive the protection circuit is turned off and full power is again supplied to the transistor to be protected. The time constant of the capacitor and resistor determined the length of time that the power supply is turned off and is usually set at an interval sufficient to allow the transistor being protected to cool to a safe temperature.

The invention is illustrated in the drawings in which.

Figure 1:
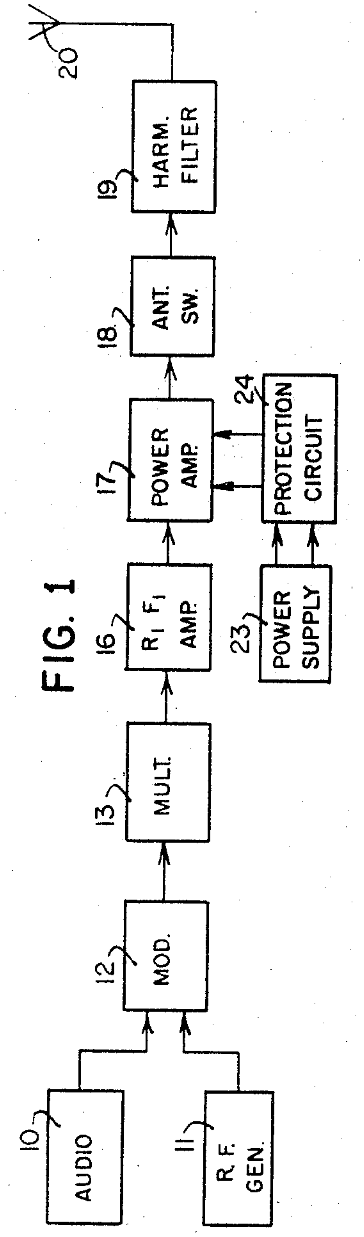
FIG. 1 is a block diagram of a radio transmitter circuit incorporating the features of this invention.

In FIG. 1 there is shown a block diagram of a radio transmitter incorporating the self-resetting protection circuit of this invention. RF generator 11 supplies a signal to modulator 12 which is modulated by an audio signal from audio circuit 10. The modulated RF signal from modulator 12 is multiplied in frequency in multiplier 13 and amplified in RF amplifier 16. Power amplifier 17 further amplifies the signal and the resulting signal is coupled to the antenna 20 through antenna switch 18 and harmonic filter 19. Power is supplied to power amplifier 17 from power supply 23 through self-resetting protection circuit 24. Power supply 23 may also supply power to the other portions of the circuitry of the transmitter.

Figure 2:
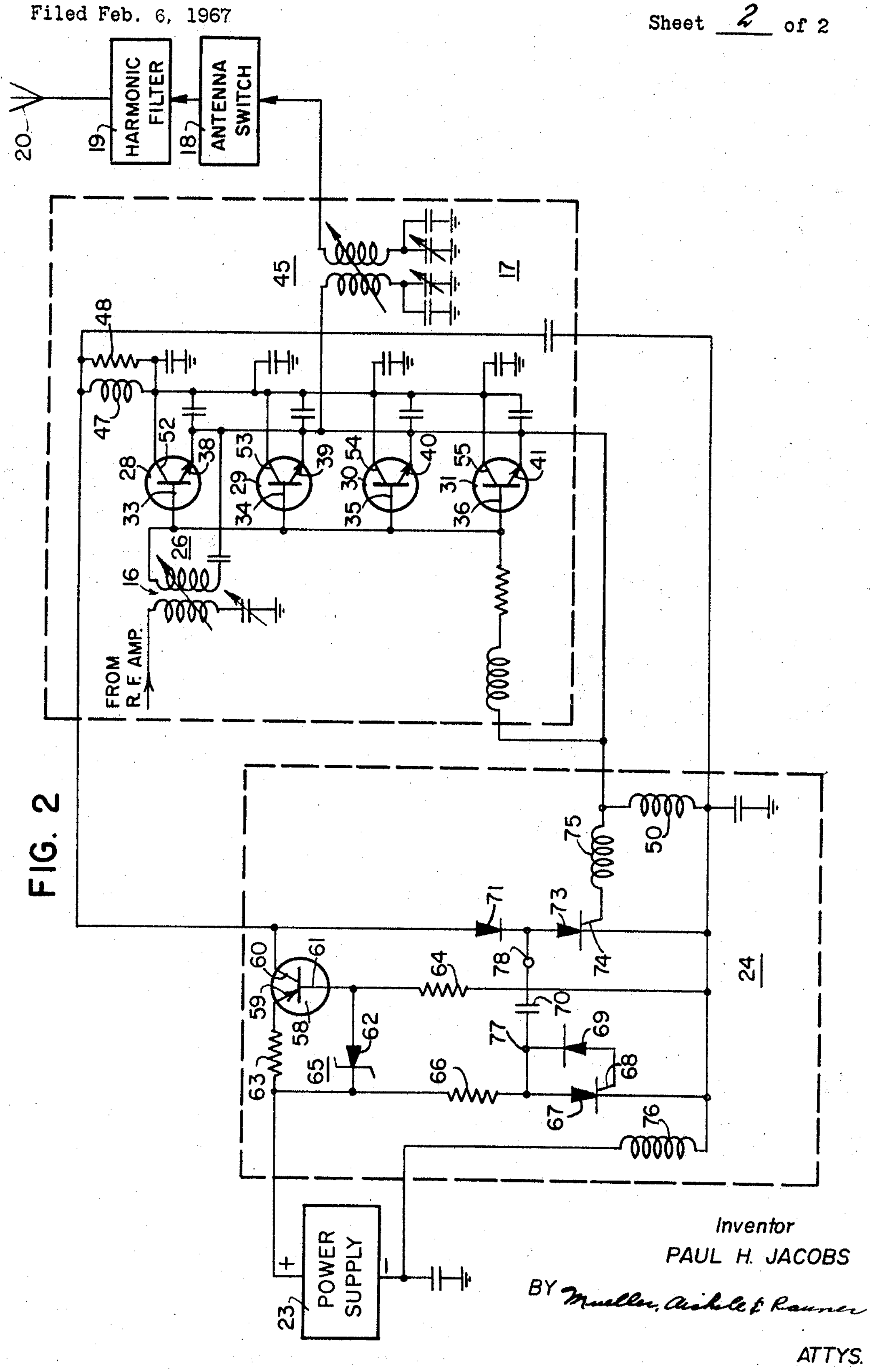
FIG. 2 is a partial schematic and partial block diagram of a portion of the transmitter of FIG. 1 illustrating the operation of the invention.

In FIG. 2 there is shown a partial schematic and partial block diagram of a circuit illustrating the operation of the self-resetting feature of this invention. Power amplifier 17 may include a plurality of power amplifier transistors 28, 29, 30 and 31 coupled in parallel. Signals from RF amplifier 16, not shown in FIG. 2, are coupled through input coupling circuit 26 to bases 33 to 36 of transistors 28 to 31 respectively. The amplified signal is coupled from emitters 38 to 41 to antenna switch 18 through coupling circuit 45. A harmonic filter 19 couples the signal to the antenna for radiation thereby.

In operation, power flows from the positive terminal of power supply 23 through resistor 63, emitter 59 and collector 60 of transistor 58, through inductance 47 and resistance 48 to collectors 52 to 55 of transistors 28 to 31. The minus terminal of power supply 23 is coupled through inductance 76 and inductance 50 to bases 33 to 36 and emitters 38 to 41 of transistors 28 to 31. Resistor 63, transistor 58 and Zener diode 62 form a limiting circuit which acts to protect SCR 73 and the power supply from excessive current flow therethrough and does not act to protect the power transistors of the power amplifier.

In operation, SCR 73 is coupled across the conductor supplying power to the transistors to be protected and is normally non-conducting. A second SCR 67 is coupled to SCR 73 through capacitor 70 and is normally conducting. Thus, terminal 77 of capacitor 70 is coupled to the minus potential of power supply 23 through conducting SCR 67 and terminal 78 of capacitor 70 is charged to a positive potential through diode 71.

When currents through any one of the transistors 28 to 31 reaches the destructive range of operation, a runaway condition occurs which causes a rapid rise in the current flowing through inductance 50. The voltage developed across inductance 50 is proportional to the rate of change of current flow therethrough and a voltage is developed across inductance 50 which is sufficient to bias control electrode 74 of SCR 73 so that SCR 73 conducts. With SCR 73 conducting the conductors supplying current through the amplifier transistors 28 to 31 are effectively shorted through diode 71 and SCR 73. This reduction in the supply potential to the power amplifier prevents the damage to the power transistors.

Limiter circuit 65 acts to limit the current flowing from power supply 23 and through diodes 71 and SCR 73 to prevent damage to the power supply and these diodes. Zener diode 62 and resistor 64 coupled in series establish a potential on base 61 which biases transistor 58 to conduction. As the flow of current through resistor 63 increases the potential appearing on emitter 59 of transistor 58 biases the transistor to reduce the conduction of transistor 58 thereby limiting the flow of current through the transistor.

With SCR 73 conducting, terminal 78 of capacitor 70 is connected to the minus terminal of power supply 23. Since the voltage across capacitor 70 cannot change instantaneously the potential at terminal 77 of capacitor 70 is below the minus potential of power supply 23, thus reverse biasing SCR 67 so that SCR 67 stops conducting. Thus when the rate of change of current flow through inductance 50 reaches a point where protective action is necessary, SCR 73 conducts and SCR 67 becomes non-conductive.

With SCR 67 non-conductive, capacitor 70 charges through resistor 66 so that the potential on terminal 77 of capacitor 70 becomes positive with respect to the potential on terminal 78. When the positive potential at terminal 77 of capacitor 70 becomes sufficiently high, Zener diode 69 breaks down and a positive potential is coupled to control electrode 68 of SCR 67 biasing SCR 67 to conduction. With SCR 67 biased to conduction, terminal 77 of capacitor 70 is substantially at the minus potential of power supply 23 while the potential at terminal 78 of capacitor 70 is reduced below this potential thus biasing SCR 73 to non-conduction. With SCR 73 biased to non-conduction the circuit is again operative to provide power to the power transistors 28 to 31.

The time interval during which power is cut off from transistors 28 to 31 is determined by the time constant of resistor 66 and capacitor 70. This time constant may be of the order of 20 milliseconds with the power amplifier transistors used in present day mobile equipment in order to give the transistors sufficient time to cool to a safe temperature. This delay is longer than the terminal time constant of the chip but does not substantially offset the intelligibility of the message. However, the time constant is not limited to this value but may be any desired value.

If a malfunction of the transistors is still present after the circuit is returned to full power operation, the protective feature will immediately cause the power supplied to the power transistors to be reduced as previously described. This on-off action will continue until the transmitter is turned off. However, in normal operation the malfunction is of a transient nature and will not be present when the transmitter is again returned to full power. Thus, the operator will not normally have to determine the cause of the malfunction and will not have to manually reset the power supply.

Figure 3:
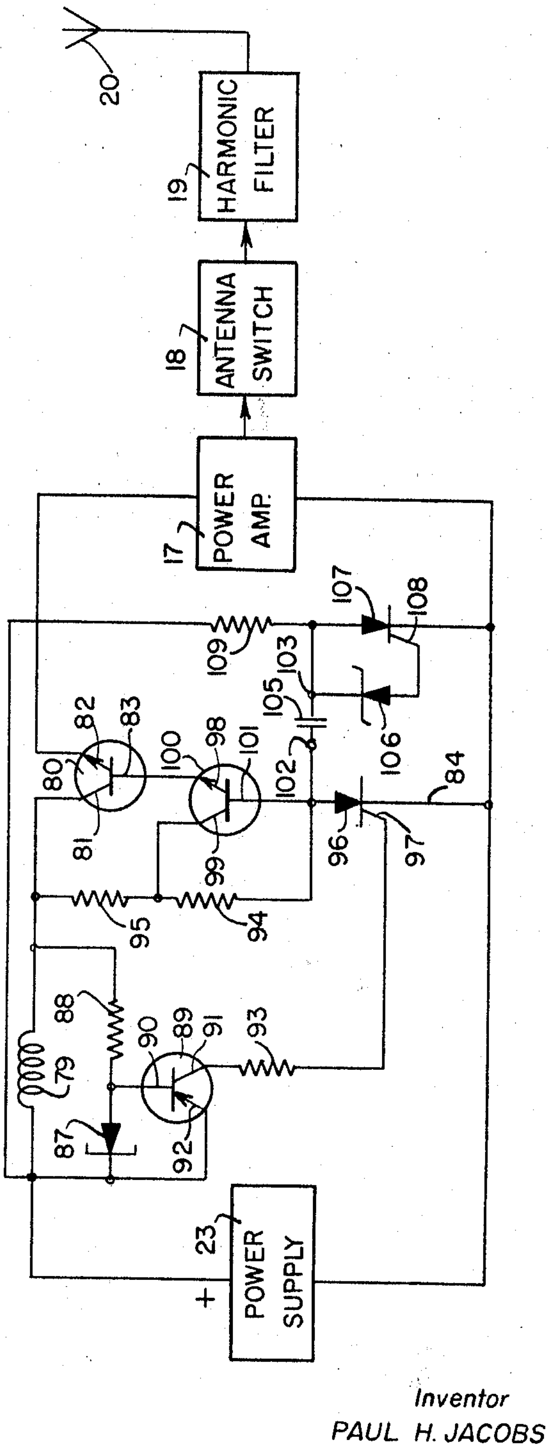
FIG. 3 is a partial schematic and partial block diagram of another embodiment of the invention.

Referring to FIG. 3, there is shown a second embodiment of this invention incorporating a different embodiment of the transistor protection circuit. The power is supplied from the power supply 23 through inductance 79, collector 81 and emitter 82 of transistor 80 to power amplifier 17 and through conductor 84 to power supply 23.

In operative SCR 96 is non-conductive and SCR 107 is conductive. The rate of change of current flow through inductance 79 is normally low enough so that the voltage appearing across inductance 79 is low. The low voltage appearing across inductance 79 is coupled across the series connection of resistor 88 and tunnel diode 87 causing a small voltage drop across tunnel diode 87. This small voltage drop is not sufficient to change the base 90, emitter 92 bias of transistor 89 so that transistor 89 is non-conductive. When the rate of change of current through inductor 79 reaches a predetermined value, a condition which occurs when there is a malfunction of one or more of the transistors of power amplifier 17, the current flow through tunnel diode 87 reaches the peak point causing a large voltage to appear across the base-emitter junction of transistor 89. This biases transistor 89 to conduction causing a positive potential to be supplied from collector 91, through resistor 83, to control electrode 97 of SCR biasing SCR 96 to conduction.

The potential supplied through resistors 94 and 95 to base 101 of transistor 100 biases transistor 100 to conduction. Base current for transistor 80 is supplied through collector 99 and emitter 98 of transistor 100 to base 83 of transistor 80. This base current is sufficient to bias transistor 80 to full conduction so that current is provided for power amplifier 17.

With SCR 96 biased to conduction the potential on base 101 of transistor 100 is reduced, biasing transistor 100 to non-conduction and cutting off the base current to transistor 80. This biases transistor 80 to non-conduction thereby cutting off or reducing the power supplied to the power amplifier 17. Thus the protection circuit acts to prevent damage to the transistors of power amplifier 17 by cutting or reducing off the power supplied thereto in the event of a malfunction of the transistors.

With SCR 96 non-conducting and SCR 107 conducting, terminal 102 of capacitor 105 becomes positive with respect to terminal 103. When the protective action of the circuit occurs, terminal 102 is coupled to the minus minus terminal of the power supply 23 through SCR 96. This reduces the potential at terminal 103 of capacitor 105 below the minus potential of power supply 23 reverse biasing SCR 107 to cause it to become non-conductive. With SCR 107 non-conductive, capacitor 105 charges through resistor 109 causing the potential at terminal 103 to become positive with respect to the potential of terminal 102. When the potential at terminal 103 becomes sufficiently high, a bias voltage is supplied through Zener diode 106 to control electrode 108 of SCR 107 biasing SCR 107 to conduction. With SCR 107 biased to conduction the potential at terminal 103 of capacitor 105 is reduced to the minus potential of power supply 23 and the potential at terminal 102 is reduced below this minus potential. This causes SCR 96 to become non-conductive and bias current is again supplied to transistor 80 causing this transistor to become conductive. With transistor 80 conductive power is again supplied to power amplifier 17. The duration of time during which the power supplied is cut off is determined by the time constant of capacitor 105 and resistor 109 and may be adjusted as required for the transistors being protected.

Thus an automatic self-resetting protection circuit has been provided for use with transmitters to protect the power transistors thereof from excessive current flow therethrough. The circuit acts to turn off the power supplied to the transistors for a period of time sufficient to allow the transistors to cool to a safe temperature and the power is automatically returned to the transistors at the end of this period. If a malfunction is still present the circuit automatically recycles. This recycling will continue as long as the transistor malfunction is present.

I claim:

1. A self-resetting protection circuit including in combination, power transistor means, a power supply having first and second output terminals, first and second conductor means coupling said power transistor means to said first and second terminals respectively, said power supply providing a range of normal operating currents to said power transistor means, said range of normal operating currents increasing to a range of destructive currents having a greater magnitude than said range of normal operating currents in response to a malfunction of said power transistor means, said first conductor means including impedance means coupled in series therewith whereby said normal and destructive ranges of currents flow therethrough, current regulating means coupled to said power transistor means and to said first and second conductor means for controlling the current supplied to said power transistor means and including a first SCR coupled between said first and second conductor means, said first SCR further having a control electrode coupled to said impedance means, said impedance means being responsive to said currents in said destructive current range to cause said first SCR to become conductive whereby current flows from said first conductor means to said second conductor means through said first SCR, said current regulating means being responsive to said flow of current through said first SCR to reduce the current supplied to said transistor means, a second SCR having a first electrode coupled to one of said first and second conductor means, a second electrode and a control electrode, circuit means including resistance means coupling said second electrode of said second SCR to the other of said first and second conductor means, capacitor means coupling said second electrode of said second SCR to said first SCR and diode means coupling said control electrode of said second SCR to said second electrode of said second SCR, said second SCR becoming non-conductive with said first SCR conductive whereby said capacitor means charges to a predetermined voltage level, said second SCR being responsive to said predetermined voltage level to become conductive whereby said capacitor means is switched across said first SCR to render the same non-conductive.

2. The self-resetting protection circuit of claim 1 wherein, said impedance means is an inductance and said diode means is a Zener diode.

3. The protection circuit of claim 2 wherein, said power transistor means includes a plurality of power transistors coupled in parallel.

4. The self-resetting protection circuit of claim 2 wherein, said current regulating means further includes resistance means and tunnel diode means series connected across said inductance means, control transistor means having an input electrode and a control electrode coupled across said tunnel diode means and an output electrode coupled to said control electrode of said first SCR, said inductance means being responsive to said currents in said destructive current range to change the voltage between said control and input electrodes of said control transistor means to cause said control transistor means to become conductive, said conductive control transistor means acting to supply a control voltage to said first SCR, said first SCR being responsive to said control voltage to become conductive whereby current flows from said first conductor means to said second conductor means through said first SCR.

5. The self-resetting protection circuit of claim 4 wherein said current regulating means includes regulating transistor means coupled in series with one of said first and second conductor means whereby said first and second ranges of current flow through said regulating transistor means, said regulating transistor means including a control electrode coupled to said first SCR, said conduction of said first SCR acting to reduce the bias current to said regulating transistor means whereby the conduction of said regulating transistor means is reduced.

6. The self-resetting protection circuit of claim 2 wherein, said first SCR includes a cathode electrode coupled to said first conductor means and an anode electrode coupled to said second conductor means, said first electrode of said second SCR being a cathode electrode coupled to said first conductor means and said second electrode of said second SCR being an anode electrode, said circuit means coupling said anode electrode to said second terminal, and said capacitor means being coupled between said anode electrodes of said first and second SCR's.

7. The self-resetting protection circuit of claim 6 wherein, one of said first and second conductor means includes current limiter means coupled between said power supply and said first SCR, whereby the current through said first SCR with the same conducting is limited to a safe value.

8. A self-resetting protection circuit including in combination, transistor means, a power supply having first and second output terminals, first circuit means including inductance means coupling said first output terminal to said transistor means, second circuit means coupling said second output terminal to said transistor means, said first and second circuit means acting to provide a supply current from said power supply to said transistor means, a first SCR having an anode electrode coupled to said second circuit means and cathode and control electrodes coupled to said first circuit means and across said inductance means, said first SCR being responsive to a rate of change of said supply current through said inductance means above a predetermined amount to become conductive and thereby reduce said supply current to a safe value, a second SCR having a cathode electrode coupled to said first circuit means and anode and control electrodes, Zener diode means coupling said control electrode of said second SCR to said anode electrode of said second SCR, third circuit means including resistance means coupling said anode electrode of said second SCR to said second terminal, and capacitance means coupling said anode electrodes of said first and second SCR's, said capacitance means acting to cause said second SCR to become non-conductive with said first SCR conductive whereby said capacitance means charges through said resistance means to a predetermined voltage, said second SCR being responsive to said predetermined voltage to become conductive whereby said capacitor means is switched across said first SCR to cause the same to become non-conductive.

9. The self-resetting protection circuit of claim 8 wherein, said second circuit means includes current limiting means coupled to said power supply, said first SCR and said transistor means, said current limiting means acting to limit the current through said first SCR to a safe value.

10. The self-resetting protection circuit of claim 8 wherein, said transistor means includes a plurality of power transistor coupled in parallel.

References Cited

UNITED STATES PATENTS

| | | | |
|---|---|---|---|
| 3,218,542 | 11/1965 | Taylor | 323—22 |
| 3,311,787 | 3/1967 | Gunderman | 317—33 |
| 3,371,262 | 2/1968 | Bird et al. | 317—33 X |
| 3,373,341 | 3/1968 | Wattson | 317—33 X |
| 3,198,989 | 8/1965 | Mahoney | 17—33 |

JOHN F. COUCH, *Primary Examiner.*

R. V. LUPO, *Assistant Examiner.*

U.S. Cl. X.R.

317—31; 323—22